United States Patent [19]

Kaneko et al.

[11] Patent Number: 4,921,729

[45] Date of Patent: May 1, 1990

[54] TWO-LAYER COATING METHOD

[75] Inventors: Nobuyoshi Kaneko; Yasuhito Naruse, both of Shizuoka, Japan

[73] Assignee: Fuji Photo Film Co., Ltd., Kanagawa, Japan

[21] Appl. No.: 104,919

[22] Filed: Oct. 6, 1987

[30] Foreign Application Priority Data

Oct. 6, 1986 [JP] Japan .................. 61-236178

[51] Int. Cl.⁵ .............................. B05D 5/12
[52] U.S. Cl. ....................... 427/131; 118/304; 118/324; 118/DIG. 4; 427/402; 427/420; 427/428; 430/935
[58] Field of Search ............ 427/402, 420, 428, 131; 118/324, 244, 304, DIG. 4; 430/935

[56] References Cited

U.S. PATENT DOCUMENTS

| 3,508,947 | 4/1970 | Hughes | 118/324 X |
| 3,632,374 | 1/1972 | Greiller | 118/324 X |
| 3,950,579 | 4/1976 | Wallace | 427/420 X |
| 4,375,498 | 3/1983 | Minez et al. | 427/420 X |

FOREIGN PATENT DOCUMENTS 59-189967 10/1984 Japan .
63-22192 5/1988 Japan .

*Primary Examiner*—Michael Lusignan
*Attorney, Agent, or Firm*—Sughrue, Mion, Zinn, Macpeak & Seas

[57] ABSTRACT

A multi-layer coating method in which a first layer is first applied to a moving web and is allowed to partially dry before a second layer is applied as a freely falling coating composition film.

11 Claims, 1 Drawing Sheet

TWO-LAYER COATING METHOD

BACKGROUND OF THE INVENTION

1. Field of the Invention

The present invention relates to a coating method.

Particularly, it relates to a coating method for applying coating compositions, such as photographic emulsion, magnetic material, or the like, onto a continuously moving web. Such a process is used in the manufacture of photographic light-sensitive materials, such as photographic film, photographic paper or the like, of magnetic recording materials, such as magnetic recording tape or the like or of other recording materials.

Even more particularly, it relates to a coating method for applying coating compositions, as a freely falling thin film, onto a moving web.

2. Background of the Invention

A typical example of the coating method for applying thin-layer coating compositions onto a moving web in the form of a freely falling coating composition film is a curtain coating method.

In the curtain coating method, a freely falling coating composition film prepared from one or more coating compositions is applied to an object to be coated. Heretofore, the curtain coating method has been used for coating of furnishing goods, iron plates and the like. As an improvement in coating quality has been demanded in the recent years, high precision coating has been required. Particularly, as disclosed in Japanese Patent Publication Nos. 24133/1974 and 35447/1974, attempts have been made to apply the curtain coating method to the fields in which high precision is required, for example, to the process of manufacturing photographic light-sensitive materials.

Referring to FIG. 1, there is shown an apparatus according to a conventional curtain coating method. In FIG. 1, fixed quantities of coating compositions $S_1$ and $S_2$ are fed to pockets 4 within a slide hopper 1 from liquid tanks (not shown) through respective quantitative pumps $P_1$ and $P_2$. The coating compositions $S_1$ and $S_2$ flow out of the pockets 4 through slots 3 extending vertically from the pockets 4 and then flow down in the form of streamer layers 8 to a lip 7 along an inclined surface 6 of the slide hopper 1. At the lip 7, falling curtains of the coating compositions $S_1$ and $S_2$, that is, a freely falling coating composition film 9, is formed. On the other hand, a web 11 fed from a web supply roll 5 is driven through pass rollers 2 and 12. The freely falling coating composition film 9 is applied to the moving web 11 to form a multilayer coating film 10. Two separated edge guides 20 vertically extend from the two ends of the lip 7 onto the coating path. The edge guides 20 facilitate the formation of the freely falling coating composition film 9 and determine the width of the film applied to the surface of the web 11. The hopper 1 has an air shield 13 for shielding the freely falling coating composition film 9 from the flow of the air entrained with the moving web before application to thereby prevent bubbles from entering between the freely falling coating composition film 9 and the surface of the web 11.

Heretofore, as a method for applying aqueous solution type coating composition, there has been known a coating method comprising the following steps. Silver halide emulsions having gelatin as a binder are applied to thereby simultaneously form a multilayer coating film. The multilayer coating film is converted to a gel by use of the sol-gel conversion characteristics of gelatin by cooling or with cool air so that the viscosity of the multilayer coating film increases so high as to be within a range of tens of thousands to hundreds of thousands cps to prevent mixing of the coating compositions into each other between layers. The multilayer coating film is finished by hot-air drying and the like.

Recently, the inventor of this application has proposed prior to this application an improvement in high-speed thin film coating, as disclosed in Japanese Patent Unexamined Publication No. 189967/1984.

In the recent years, however, it is required that the coating is made thinner and made quickly. With such a requirement, it becomes difficult to produce a coating film having multiple layers separated from each other because the probability increases that mixing of the coating compositions occurs before the multilayer coating film is formed on the web as the coating composition quantity per unit area in each layer decreases. This coating composition quantity will hereinafter be abbreviated to "coating quantity".

On the other hand, in the case where organic solvent type coating compositions are applied, mixing of the coating compositions at a portion for applying the freely falling coating composition film onto the web occurs relatively easily compared to that in the case where aqueous solution type coating compositions are applied. This difference arises because the surface tension of organic solvent type coating compositions is lower than that of aqueous solution type coating compositions. Accordingly, it is more difficult to attain a coating film having multiple layers separated from each other.

According to the Japanese Patent Publication Nos. 24133/1974 and 35447/1974, one or more kinds of coating compositions are supplied between the two edge guides 20, as shown in FIG. 1, by a slide type or extrusion type injector to form freely falling coating composition films 9 to be applied to the continuously moving web 11. The two edge guides 20 have the double function of limiting the coating width and stabilizing the freely falling coating films 9. Further, according to the Japanese Patent Publication No. 24133/1974, the air shield 13 is used for shielding the freely falling coating composition film 9 from the flow of the air entrained with the moving web.

In spite of the provision of the aforementioned mechanism for stabilizing the freely falling coating composition film, uniform coating becomes more difficult as the coating quantity decreases (that is, as the coating compositions are applied more thinly) or as the moving speed of the web increases (that is, as the coating compositions are applied more quickly). In short, in the curtain coating method, as the coating compositions are applied thinly and speedily, deformations or fluctuations occur when the multilayer coating film 10 on the moving web 11 is formed from the freely falling coating composition films 9. The occurrence of deformation or fluctuation causes mixing of the coating compositions within the multilayer coating film 10 formed on the web 11. On the other hand, according to the Japanese Patent Unexamined Publication No. 189967/1984, a lowermost layer part of the coating compositions is applied as a pretreatment for curtain coating. However, in the case where a solvent is applied as a lowermost layer part of the coating compositions, it is difficult to pile up two-layer coating compositions at the next step of applying the freely falling coating composition film so that mixing of the coating compositions between the two layers occurs easily. Further, because a lowermost layer part of the freely falling coating composition film is applied as a pretreatment, two coating compositions cannot be simultaneously applied. Accordingly, the proposed coating method is inferior in manufacturing efficiency, hence further improvement in manufacturing efficiency has been desired.

SUMMARY OF THE INVENTION

An object of the present invention is to provide a coating method for applying at least two coating compositions to form a multilayer coating film without mixing the coating compositions into each other at the interface between layers.

Another object of the invention is to provide a coating method for applying coating composition both thinly and speedily.

A further object of the invention is to provide a curtain coating method with improved stability of the freely falling curtain.

To attain the foregoing objects, the coating method for applying at least two coating compositions onto a moving web, according to the present invention, comprises the steps of applying one of the two coating compositions onto the web to form a coating layer and then applying the other of two coating compositions onto the coating layer in the form of a freely falling coating composition film before the first coating layer has been completely dried.

DETAILED DESCRIPTION OF THE PREFERRED EMBODIMENTS

Figure 2:
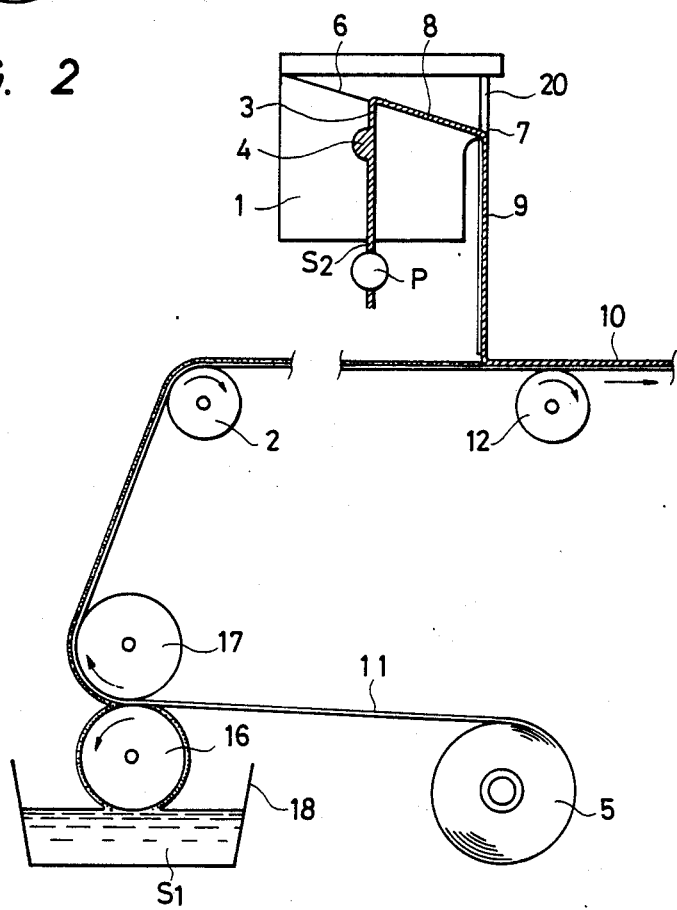
FIG. 2 is a typical side view showing a coating method according to the present invention.

Referring now to FIG. 2, there is shown a coating method according to the present invention.

As shown in FIG. 2, a coating composition $S_1$ is applied onto a moving web 11 through a roll coater 16 to form a lowermost coating layer. Then, another coating composition $S_2$ is applied onto the lowermost coating layer in the form of a freely falling coating composition film before the lowermost coating layer has been completely dried. Thus, a multilayer film 10 is formed on the web 11 without mixing the coating compositions into each other between layers. Further, when the freely falling coating composition film is applied, a good wetness condition can be instantaneously attained. Accordingly, the multilayer film 10 can be applied thinly and speedily without deformation or fluctuation of the coating composition film.

In the present invention, it is preferable that the solvent content of the coating composition $S_1$ applied onto the web is 0.3 to 7.5 cc/m² just before the application of the freely falling coating composition. If it is less than 0.3 cc/m², mixing of the coating compositions into each other between layers will often occur. If it is more than 7.5 cc/m², the liquid film formation from the upper coating composition $S_2$ will be often hindered.

Although the embodiment has shown the case where a roll coating method is used for application of the lowermost layer coating compositions $S_1$, it is to be understood that the present invention is not limited to the specific embodiment but any method, for example a doctor coating method or a gravure coating method, can be used for application of the lowermost layer coating composition $S_1$.

The meaning of the words "before the lowermost coating layer has been completely dried" is that, when the next, freely falling coating composition film is applied, the lowermost coating layer is in a state where it is sufficiently wet to the next coating film but where the coating compositions are not mixed into each other between layers. Accordingly, the meaning is that the solvent in the lowermost layer is more or less evaporated, that is, is partially dried.

In the present invention, the freely falling coating composition film may be formed by use of a slide type hopper or may be formed by use of an extrusion type hopper.

Examples of the web used in the present invention include a paper web, a resin film web, a metal web, a resin-coated paper web, a synthetic paper web and the like. Typical examples of resin materials used in the resin film web are polyolefins, such as polyethylene, polypropylene and the like; vinyl polymers, such as polyvinyl acetate, polyvinyl chloride, polystyrene and the like; polyamides, such as 6, 6-Nylon, 6-Nylon and the like; polyesters, such as polyethylene terephthalate, polyethylene-2, 6-naphthalate, and the like; polycarbonates; cellulose acetates, such as cellulose triacetate, cellulose diacetate and the like. Typical examples of resin materials used in the resin-coated paper web are polyolefins, such as polyethylene and the like, but the resin materials are not limited thereto. A typical example of the metal web is an aluminum web.

With respect to the coating compositions used in the present invention, various kinds of liquid compositions can be used in accordance with the purpose. Examples of the coating compositions include: coating compositions for forming light-sensitive emulsion layers, sub layers, protective layers, back layers and the like as in photographic light-sensitive materials; coating compositions for forming magnetic layers, sub layers, lubricating layers, protective layers, back layers and the like as in magnetic recording media; and other coating compositions for forming adhesive layers, coloring layers, rust preventive layers and the like. These coating compositions are prepared by mixing the active material in soluble binders or organic binders.

The following example is given to illustrate the effect of the invention more clearly.

EXAMPLE

Coating composition A—a fluid of viscosity of 50 cp, composed of the following components.

Phenol resin: 29.8 parts by weight
Dye: 0.1 parts by weight
Cellosolve acetate: 54 parts by weight
Methylethyl ketone: 16 parts by weight
Fluorine-containing surface active agent: 0.1 parts by weight Coating composition B—a fluid of viscosity of 3 cp, composed of the following components.

Polyvinyl formal resin: 2 parts by weight
Methylcellosolve: 58 parts by weight
Methanol: 40 parts by weight Using the coating apparatus as shown in FIG. 2, a 180 μm thick web 11 made of polyethylene terephthalate was driven at a speed of 80 m per minute. The coating composition B was applied onto the moving web 11 through a roll coater 16 to thereby form a lower coating layer with a width of 120 cm and a coating quantity of 4 cc/m². Before the coating layer was completely dried, the coating composition A was applied as a freely falling coating composition film onto the lower coating layer to thereby form a coating film with a width of 110 cm and a coating quantity of 20 cc/m².

The lower layer coating portion and the freely falling coating composition film coating composition film coating portion of the apparatus were separated by a distance of 100 cm along the web moving path. The freely falling coating composition film 9 was dropped from a height of 3 cm. The freely falling coating composition film was so stable that deformation or fluctuation could not occur. Accordingly, the surface properties of the coating film was so excellent that mixing of the coating compositions into each other between the layers could not occur.

COMPARATIVE EXAMPLE

Figure 1:
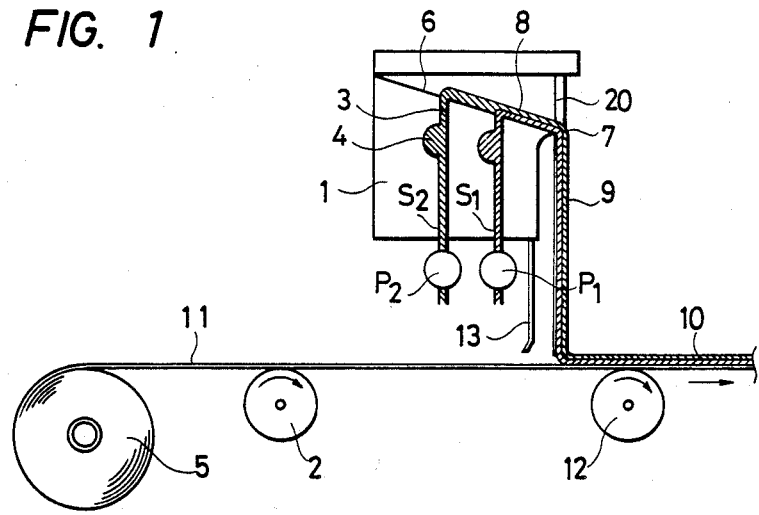
FIG. 1 is a typical side view of a curtain coating apparatus according to a conventional coating method.

Using the coating apparatus as shown in FIG. 1, the 180 μm thick web 11 made of polyethylene terephthalate was driven at a speed of 40 m per minute. The two coating compositions were simultaneously applied as freely falling coating composition films onto the moving web to thereby form a two-layer coating film with a width of 110 cm and a quantity of 20 cc/m². As a result, the freely falling coating composition films were so unstable that fluctuations occurred. Accordingly, stripe-like irregularities occurred on the coating surface and mixing of the coating compositions into each other between the layers occurred.

As described above, the present invention is directed to a coating method for applying at least two coating compositions onto a moving web. The method comprises the steps of applying one of the at least two coating compositions onto the web to form a coating layer and applying another of the at least two coating composition onto the coating layer in the form of a freely falling coating composition film before the first coating layer has been completely dried. Accordingly, mixing of the coating compositions into each other between the coating layers can be prevented. Further, the freely falling coating composition film becomes so stable that multilayer coating can be made speedily and thinly. In addition, the following effects can be attained.

(1) The coating and drying steps which must be repeated in the prior art due to the impossibility of simultaneous multilayer coating, can be greatly simplified by the coating method of the invention.

(2) Because the freely falling coating composition film becomes stable, there is no necessity of air shielding means.

(3) When the coating composition flows out of the slot to form a liquid film, a stripe-like irregularity is often caused by impurities or bubbles in the coating composition. However, such a stripe-like irregularity can be reduced accordingly to preparatory coating or in other words according to a so-called leveling effect.

We claim:

1. In a coating system, a coating method for applying at least two coating compositions onto a moving web comprising the steps of:
   moving a continuous web;
   a first step of applying one of said at least two coating compositions onto said moving web at a first location within said coating system to form a coating layer on said web; and
   a second step, subsequent to said first step, of applying the other one of said at least two coating compositions onto said coating layer of said moving web at a second location, separate from said first location, within said coating system in the form of a freely falling coating composition thin film before said coating layer has been completely dried, substantially all of said freely falling coating composition thin film being continuously deflected in a moving direction of said web and adhering to said coating layer.

2. A coating method as recited in claim 1, wherein said second step in performed after said coating layer has been partially dried.

3. A coating method as recited in claim 1, wherein a solvent content of said one coating composition in said coating layer immediately before said second step is in a range of 0.3 to 7.5 cc/m².

4. A coating method as recited in claim 2, wherein a solvent content of said one coating composition in said coating layer immediately before said second step is in a range of 0.3 to 7.5 cc/m².

5. A coating method as recited in claim 1, wherein said first step includes roll coating said one coating composition onto said moving web.

6. A coating method as recited in claim 1, wherein at least one of said one and said other of said at least two coating compositions is a photographic material.

7. A coating method as recited in claim 1, wherein at least one of said one and said other of said at least two coating compositions is a selectively magnetizable material.

8. A coating apparatus comprising:
   first means for applying a first coating composition including a solvent to a moving web to form a first coating layer on said web;
   second means for applying a second coating composition, subsequent to the application of said first coating composition, onto said first coating layer of said moving web in the form of a freely falling coating composition thin film before said first coating layer has been completely dried, substantially all of said freely falling coating composition thin film being continuously deflected in a moving direction of said web and adhering to said first coating layer, said second means being spaced apart from said first means along a moving path of said web; and
   means for continuously moving said web operatively through and along said moving path between said first and second applying means.

9. A coating apparatus as recited in claim 8, wherein aid first applying means includes a roll coater.

10. A coating apparatus as recited in claim 8, wherein at least one of said first and second coating compositions comprises a photographic photosensitive material.

11. A coating apparatus as recited in claim 8, wherein at least one of said first and second coating compositions comprises a selectively magnetizable material.

* * * * *